455-608 AU 233 EX CROSS REFERENCE EXAMINER
FIP3106 XR 3,389,341

June 18, 1968 D. E. THOMAS 3,389,341

SIMULTANEOUS PHOTODETECTOR AND ELECTRICAL MODULATOR

Filed Feb. 9, 1965

INVENTOR
D. E. THOMAS
BY Lyman Sherman
ATTORNEY

United States Patent Office

3,389,341

Patented June 18, 1968

3,389,341

SIMULTANEOUS PHOTODETECTOR AND ELECTRICAL MODULATOR

Donald E. Thomas, Madison, N.J., assignor to Bell Telephone Laboratories, Incorporated, New York, N.Y., a corporation of New York Filed Feb. 9, 1965, Ser. No. 431,313
3 Claims. (Cl. 329—144)

ABSTRACT OF THE DISCLOSURE

Simultaneous photodetection and electrical modulation is provided by means of a pair of photodiodes connected series-aiding to a common load resistor. The load resistor is selected to be larger than the diode resistances when photo excited, but small compared to the dark resistance of each of the diodes. When exposed to modulated light, a photodiode is capable of conducting and demodulating the light. However, because the two diodes are series connected, conduction only occurs when both diodes are in their conduction states simultaneously. As a result, the voltage developed across the load resistor contains modulation product frequency components given by $n_1f_1 \pm n_2f_2$, where $f_1$ and $f_2$ are the light modulating frequencies and $n_1$ and $n_2$ are integers. A suitable bandpass filter is used to abstract one of the modulation product components.

Figure 1:
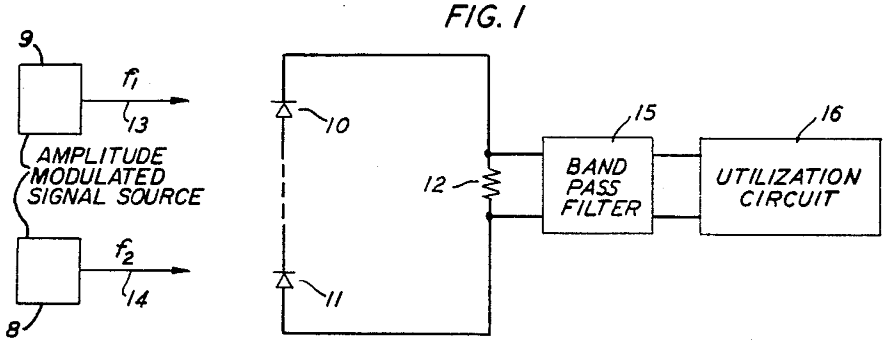

This invention relates to combined photodetectors and electrical modulators.

The invention of the optical maser, or laser, has greatly stimulated research in the optical region of the frequency spectrum. For example, it is frequently desirable to study phenomena involving light excitation by light of two or more wavelengths to generate light at a wavelength different from those of the excitation sources.

In studying such phenomena, it is theoretically possible to select the desired wavelength for detection by optical filtering. However, when the energy at the desired wavelength is many orders of magnitude lower than the energies at the wavelengths to be rejected, some assistance is usually needed from an electronic detection system to separate the wanted from the unwanted signals.

A typical arrangement for electrically detecting low energy signals is disclosed in an article by H. Z. Cummins, N. Knable and Y. Yeh entitled, "Spurious Harmonic Generation in Optical Heterodyning," published in the August 1963 issue of Applied Optics, pages 823–825. As illustrated in this article, such arrangements use "phase" (or "lock-in") detectors in order to obtain very narrow effective noise bandwidths and, thereby to lower the level of the minimum detectable wanted signal. Such a system, however, requires a synchronous reference signal at the frequency of the signal it is desired to detect.

In accordance with the present invention, a reference signal, such as is required by the phase detector in the aforementioned article, is obtained by means of a plurality of photodetectors, connected in series to a common load resistor.

If only two photodetectors are used, they can be connected either series-aiding or series-opposing. Advantageously, however, the photodetectors are connected series-aiding for more efficient operation. If more than two photodetectors are used, they are connected series-aiding.

Each of the photodetectors is exposed to a separate one of the amplitude modulated optical beams used to generate the signal that is sought to be measured by means of the phase detector. When so exposed, the photodetectors conduct and demodulate the optical signals, producing a voltage across the load resistor which includes modulation product frequency components given by $\pm n_1f_1 \pm n_2f_2 \ldots \pm n_if_i$, where the $n$'s are integers, and the $f$'s are the modulation frequencies. The desired modulation frequency is obtained by passing the signal generated across the load resistor through a narrow bandpass electrical filter. The filter selectively passes wave energy at the reference signal frequency. This wave energy is then used as the reference signal to detect the equivalent frequency component of the electrically detected optical signal which contains the desired physical information.

It is an advantage of the present invention, that the photodetectors not only serve as detectors to generate electrical signals at the modulation frequencies of the optical beams, but also simultaneously operate as a modulator to generate the required electrical reference signal needed to measure the optical phenomena under investigation.

Figures 2, 3, 4:
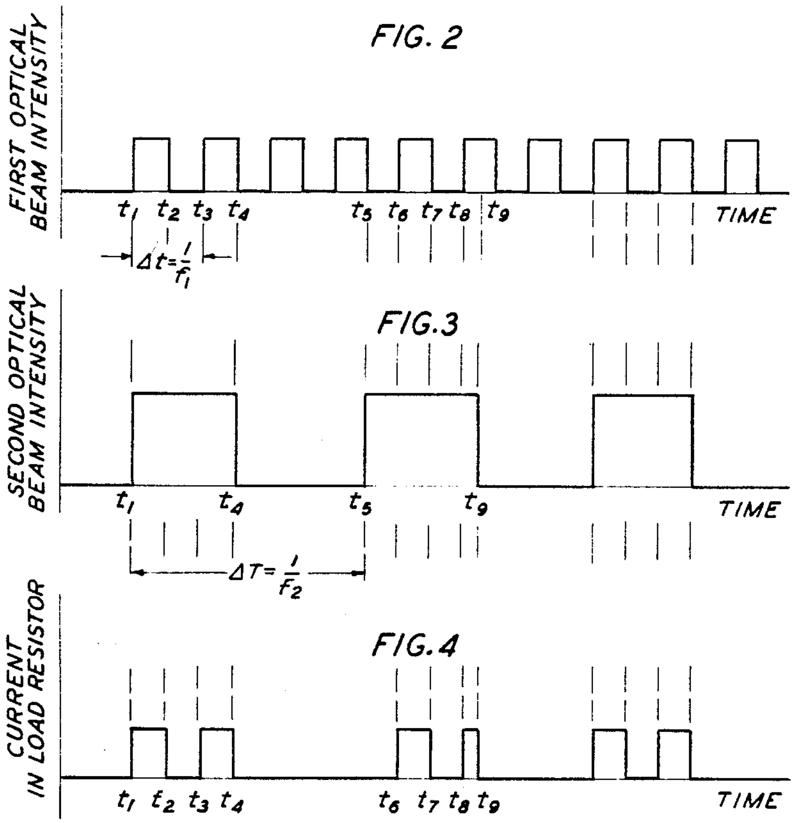

This and other advantages of the nature of the present invention, and its various features, will appear more fully upon consideration of the illustrative embodiment now to be described in detail in connection with the accompanying drawings, in which:

FIG. 1 shows a photodetector and electrical modulator in accordance with the invention;

FIGS. 2 and 3, included for purposes of explanation, show the modulation waveforms of the optical waves applied to the respective photodetectors; and FIG. 4 shows the waveform of the current in the common load resistor.

Referring to the drawings, FIG. 1 shows a photodetector and electrical modulator, in accordance with the invention, comprising a plurality of photodetectors 10 and 11, series-connected to a common load resistor 12. Advantageously, the load resistor is selected to be larger than the detector resistances when photo-excited, but small compared to the dark resistance of each photodetector. While only two detectors are shown, the use of a dashed line to connect detectors 10 and 11 is to indicate that additional photodetectors can be included therebetween if required. In addition, whereas the photodetectors 10 and 11 are illustrated simply as photodiodes, it is to be understood that these detectors can be phototraveling-wave tubes, photoklystrons, photomultipliers, or any other of the many photo responsive devices known in the art.

Each of the detectors 10 and 11 is exposed to a different one of two amplitude modulated optical signals, derived from signal sources 8 and 9 which typically are of different optical wavelengths. The two amplitude modulated optical signals are indicated by the respective arrows 13 and 14. The modulating frequencies are designated $f_1$ and $f_2$.

When exposed to a light source, a photodetector is rendered capable of conducting and demodulating the incident light. However, because the diodes in the illustrative embodiment are connected in series, conduction only occurs during those time intervals when all the detectors are in their conduction state simultaneously.

For purposes of illustration and explanation, let a typical situation be considered, wherein each of the individual light beams has been passed through a mechanical chopper of different chopping frequency. The result is to produce pulse-modulated light beams whose modulation amplitudes can be illustrated as in FIGS. 2 and 3.

FIG. 2 shows the intensity of the first of the two light beams, modulated at a pulse repetition rate $f_1$, and applied to photodetector 10. FIG. 3, drawn to the same time scale, shows the intensity of the second light beam, modulated at a pulse repetition rate $f_2$, and applied to photodetector 11.

When applied to their respective photodetectors, each light beam generates a photovoltage having the same fundamental frequency and essentially the same waveshape as the chopped light beam. Current, however, flows through the load resistor 12 only during those time intervals where both photodetectors are in their conduction state simultaneously. Referring to FIGS. 2 and 3, the second light beam renders photodetector 11 conductive during the time interval $t_1$ to $t_4$. Within that same time interval, however, photodetector 10 is rendered photoconductive during the periods from $t_1$ to $t_2$, and $t_3$ to $t_4$, but not during the interval $t_2$ to $t_3$. Thus, during the interval $t_1$ to $t_4$, current flows through resistor 12 from $t_1$ to $t_2$ and then from $t_3$ to $t_4$, as shown in FIG. 4.

During the entire interval from $t_4$ to $t_5$, photodetector 11 is nonconducting, and no current flows through resistor 12. During the following time interval from $t_5$ to $t_9$, photodetector 11 is again rendered conducting and current flows through resistor 12 during those time intervals during which photodetector 10 is simultaneously rendered conducting. This occurs during the periods between $t_6$ to $t_7$ and $t_8$ to $t_9$, as indicated in FIG. 4. The voltage across resistor 12, as shown in FIG. 4, is thus the product of the modulation waveforms shown in FIGS. 2 and 3.

A Fourier analysis of the resulting voltage generated across resistor 12 discloses the presence of modulation product frequency components given by $$\pm n_1 f_1 \pm n_2 f_2$$

where $n_1$ and $n_2$ are integers.

More generally, if more than two photodetectors are used, the voltage generated across resistor 12 is the product of all the modulation waveforms and includes frequency components $$\pm n_1 f_1 \pm n_2 f_2 \pm n_3 f_3 \ldots \pm n_i f_i$$

where the $n$'s are integers and the $f$'s are the optical beam modulating frequencies.

Typically, the first order sum or difference frequencies, being the largest, are used as a reference signal in a phase detector. Accordingly, in a two detector embodiment, the voltage across resistor 12 is applied to a bandpass filter 15, that is tuned to either the sum frequency $f_1+f_2$ or the difference frequency $f_1-f_2$, and the output from the filter is applied to a utilization circuit 16. More generally, however, any one or more of the frequency components produced in resistor 12 can be selected and utilized by suitably designing the filter 15.

While the invention has been described as a means for generating a reference signal for use with a phase detector, it is understood that this is only by way of example. More generally, a photodetector and electrical modulator, in accordance with the present invention, can be used whenever amplitude modulated optical waves are to be demodulated and the resulting signals electrically modulated to produce sum and difference frequency components. Thus, in all cases it is understood that the above-described arrangement is merely illustrative of one of the many possible specific embodiments which can represent applications of the principles of the invention. Numerous and varied other arrangements can readily be devised in accordance with these principles by those skilled in the art without departing from the spirit and scope of the invention.

What is claimed is:

1. In combination:

a pair of photodetectors connected in series with a common resistor;

said resistor having a resistance that is larger than the resistance of said detectors when photo-excited but smaller than the dark resistance of each of said detectors;

a first optical wave, amplitude modulated at a frequency $f_1$, applied to one of said detectors;

a second optical wave, amplitude modulated at a frequency $f_2$, applied to the other of said detectors;

and means for extracting an output signal from said resistor including a bandpass filter coupled to said resistor for passing signal wave energy at a predetermined frequency $n_1 f_1 \pm n_2 f_2$, wherein $n_1$ and $n_2$ are integers.

2. In combination:

a pair of photodetectors connected in series with a common resistor;

said resistor having a resistance that is larger than the resistance of said detectors when photo-excited but smaller than the dark resistance of each of said detectors;

a first optical wave, amplitude modulated at a frequency $f_1$, applied to one of said detectors;

a second optical wave, amplitude modulated at a frequency $f_2$, applied to the other of said detectors;

and means for extracting an output signal from said resistor including a bandpass filter coupled to said resistor a predetermined frequency $n_1 f_1 \pm n_2 f_2$, where $n_1$ and $n_2$ are integers.

3. The combination according to claim 2 wherein said predetermined frequency is $f_1-f_2$.

References Cited

UNITED STATES PATENTS

| | | | |
|---|---|---|---|
| 3,040,178 | 6/1962 | Lyman et al. | 307—88.5 |
| 3,050,633 | 8/1962 | Loebner | 250—213 |
| 3,086,122 | 4/1963 | Jones | 332—3 X |
| 3,211,900 | 10/1965 | Bray | 250—213 |
| 3,229,231 | 1/1966 | Saraga | 329—50 X |
| 3,272,988 | 9/1966 | Bloom et al | 250—208 X |
| 3,321,631 | 5/1967 | Biard et al. | 250—213 |

ALFRED L. BRODY, *Primary Examiner.*